US010757702B2

(12) United States Patent
Wang et al.

(10) Patent No.: US 10,757,702 B2
(45) Date of Patent: Aug. 25, 2020

(54) MANAGING RESOURCES FOR COOPERATIVE UPLINK TRANSMISSION

(71) Applicants:QUALCOMM INCORPORATED, San Diego, CA (US); Neng Wang, Beijing (CN); Mingxi Fan, San Diego, CA (US); Naga Bhushan, San Diego, CA (US)

(72) Inventors: Neng Wang, Beijing (CN); Mingxi Fan, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 15/521,520

(22) PCT Filed: Jul. 3, 2015

(86) PCT No.: PCT/CN2015/083266
§ 371 (c)(1),
(2) Date: Apr. 24, 2017

(87) PCT Pub. No.: WO2016/070637
PCT Pub. Date: May 12, 2016

(65) Prior Publication Data
US 2017/0318586 A1    Nov. 2, 2017

(30) Foreign Application Priority Data

Nov. 5, 2014  (WO) ................ PCT/CN2014/090322

(51) Int. Cl.
*H04W 72/04*    (2009.01)
*H04L 5/00*     (2006.01)
(Continued)

(52) U.S. Cl.
CPC ........ *H04W 72/0453* (2013.01); *H04B 7/026* (2013.01); *H04L 5/0035* (2013.01);
(Continued)

(58) Field of Classification Search
CPC ... H04W 52/223; H04W 52/42; H04W 52/46; H04W 72/0453; H04W 72/00;
(Continued)

(56) References Cited

U.S. PATENT DOCUMENTS

2006/0182022 A1* 8/2006 Abedi ............... H04W 72/1278
370/229
2010/0329142 A1   12/2010 Hao et al.
(Continued)

FOREIGN PATENT DOCUMENTS

CN    101282156 A    10/2008
CN    102780993 A    11/2012
(Continued)

OTHER PUBLICATIONS

International Search Report and Written Opinion—PCT/CN2014/090322—ISA/EPO—dated Aug. 6, 2015.
(Continued)

*Primary Examiner* — Jianye Wu
(74) *Attorney, Agent, or Firm* — Patterson + Sheridan, LLP

(57) ABSTRACT

Certain aspects of the present disclosure relate to techniques for managing resources for cooperative uplink transmission. A base station may determine different groups for a plurality of user equipments (UEs) participating in cooperative uplink transmission, and transmit mode configurations indicating whether or not UEs in each group are configured to transmit data as a data source or to relay data received from another UE configured to transmit data as a data source. A UE may participate, with one or more other UEs, in cooperative
(Continued)

uplink transmission to the base station, wherein each UE belongs to a group. The UE may determine, for a transmission time interval (TTI), at least one operation to perform for the cooperative uplink transmission based, at least in part, on a group number of a group to which the UE belongs and an index of the TTI.

28 Claims, 14 Drawing Sheets

(51) Int. Cl.
    *H04W 92/18*     (2009.01)
    *H04W 52/46*     (2009.01)
    *H04B 7/26*     (2006.01)
    *H04B 7/026*     (2017.01)
    *H04W 52/42*     (2009.01)
    *H04W 88/04*     (2009.01)
    *H04W 24/10*     (2009.01)
    *H04B 7/155*     (2006.01)
    *H04W 52/22*     (2009.01)
    *H04W 72/00*     (2009.01)

(52) U.S. Cl.
CPC .......... *H04L 5/0037* (2013.01); *H04L 5/0044* (2013.01); *H04L 5/0082* (2013.01); *H04L 5/0096* (2013.01); *H04W 52/42* (2013.01); *H04W 52/46* (2013.01); *H04W 72/0446* (2013.01); *H04W 72/0473* (2013.01); *H04W 92/18* (2013.01); *H04B 7/15592* (2013.01); *H04L 5/006* (2013.01); *H04L 5/0076* (2013.01); *H04W 24/10* (2013.01); *H04W 52/223* (2013.01); *H04W 72/00* (2013.01); *H04W 88/04* (2013.01)

(58) Field of Classification Search
CPC ......... H04W 72/0446; H04W 72/0473; H04W 88/04; H04W 24/10; H04W 92/18; H04L 5/0076; H04L 5/0037; H04L 5/0044; H04L 5/0006; H04L 5/0082; H04L 5/0096; H04L 5/0035; H04B 7/026; H04B 7/15592

See application file for complete search history.

(56) References Cited

U.S. PATENT DOCUMENTS

| | | | |
|---|---|---|---|
| 2011/0167326 A1* | 7/2011 | Kuri | H04B 7/155 714/807 |
| 2013/0029680 A1 | 1/2013 | Park et al. | |
| 2013/0107851 A1 | 5/2013 | Park et al. | |
| 2013/0176934 A1 | 7/2013 | Malladi et al. | |
| 2013/0287008 A1* | 10/2013 | Holma | H04J 13/16 370/335 |
| 2014/0171062 A1 | 6/2014 | Fallgren et al. | |
| 2014/0185487 A1 | 7/2014 | Cho et al. | |
| 2016/0277081 A1* | 9/2016 | Wei | H04B 7/0639 |
| 2017/0215160 A1* | 7/2017 | Lohr | H04W 76/14 |

FOREIGN PATENT DOCUMENTS

| | | |
|---|---|---|
| CN | 103765950 A | 4/2014 |
| CN | 104041174 A | 9/2014 |
| JP | 2011029990 A | 2/2011 |
| JP | 2013214974 A | 10/2013 |
| WO | WO-2012023819 A2 | 2/2012 |
| WO | WO-2013103754 | 7/2013 |

OTHER PUBLICATIONS

Supplementary European Search Report—EP15856242—Search Authority—The Hague—dated Jun. 18, 2018.
International Search Report and Written Opinion for PCT/CN2015/083266, dated Aug. 26, 2015.
Chen, Xin, Research on Device-to-Device Relaying Technology for TD-LTE-A System, Chinese Master's Theses Full-text Database Information Science and Technology, Apr. 15, 2014 (Apr. 15, 2014), ISSN 1674-0246, pp. 24-25, 30-33, 39-42 and figures 4-1, 4-2.

* cited by examiner

US 10,757,702 B2

MANAGING RESOURCES FOR COOPERATIVE UPLINK TRANSMISSION

CLAIM OF PRIORITY

The present application for patent claims priority to International application No. PCT/CN2014/090322, filed 5 Nov. 2014, which is assigned to the assignee hereof and expressly incorporated herein by reference.

TECHNICAL FIELD

The present disclosure relates generally to wireless communication and, more particularly, to methods and apparatus for managing resources for cooperative uplink transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements. Preferably, these improvements should be applicable to other multi-access technologies and the telecommunication standards that employ these technologies.

SUMMARY

Certain aspects of the present disclosure provide a method for wireless communications by a user equipment (UE). The method generally includes participating, with one or more other UEs, in cooperative uplink transmission to a base station, wherein each UE belongs to a group, and determining, for a Transmission Time Interval (TTI), at least one operation to perform for the cooperative uplink transmission based, at least in part, on a group number of a group to which the UE belongs and an index of the TTI.

Certain aspects of the present disclosure provide a method for wireless communications by a base station. The method generally includes determining different groups for a plurality of UEs participating in cooperative uplink transmission to the base station, wherein operations performed by a UE in a transmission time interval (TTI) is based, at least in part, a group number of a group to which the UE belongs and an index of the TTI, and transmitting mode configurations indicating whether or not UEs in each group are configured to transmit data as a data source or to relay data received from another UE configured to transmit data as a data source.

Aspects generally include methods, apparatus, systems, computer program products, and processing systems, as substantially described herein with reference to and as illustrated by the accompanying drawings. "LTE" refers generally to LTE and LTE-Advanced (LTE-A).

DETAILED DESCRIPTION

Figure 1:
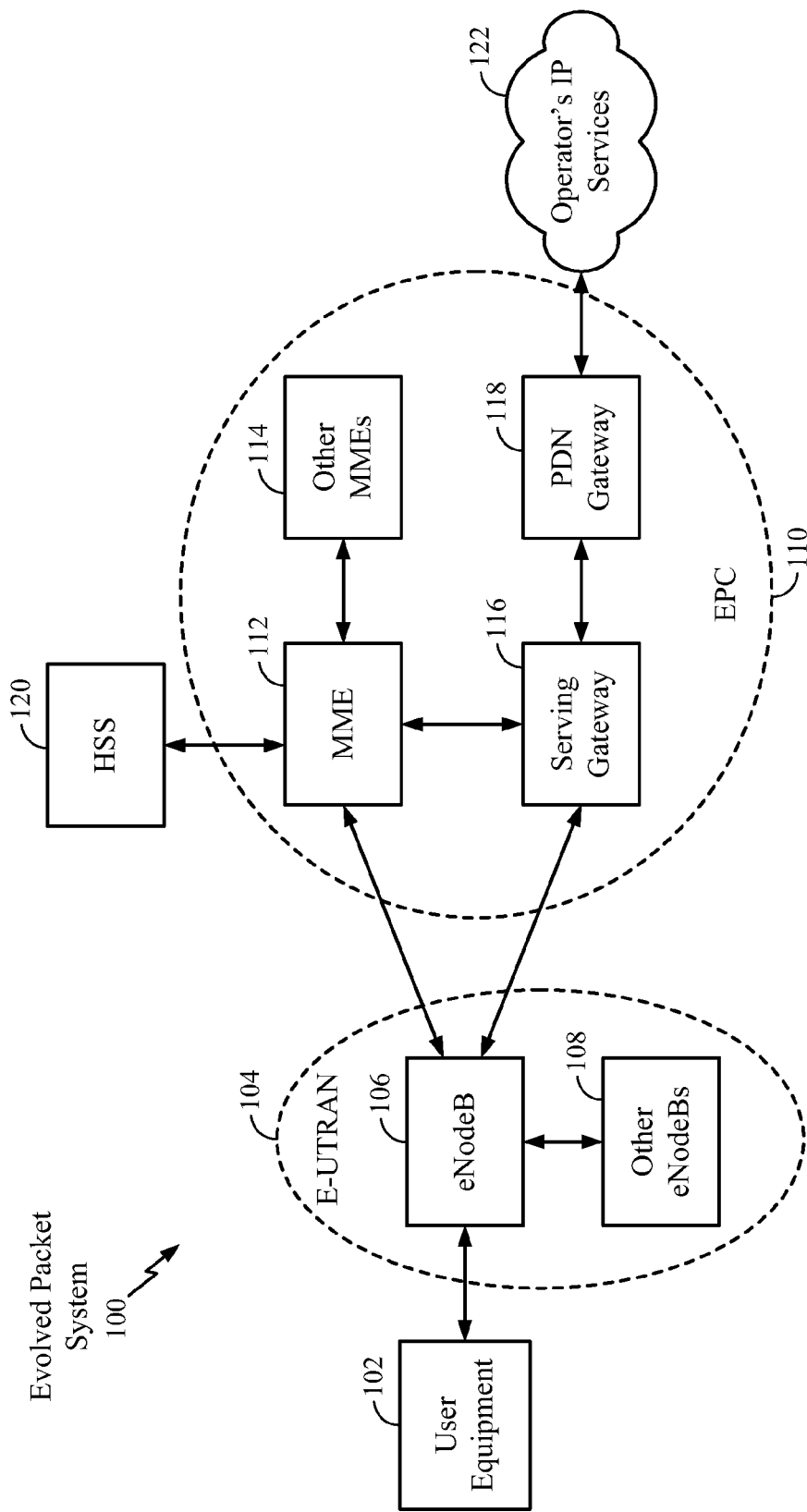
FIG. 1 is a diagram illustrating an example of a network architecture.

It has been found that performance of a UE at cell edges may be significantly improved by employing uplink cooperative MIMO relaying, when direct transmission cannot be successfully pursued between the UE and a serving base station. UL cooperative MIMO transmission may include opportunistic, distributed MIMO relaying of UE uplink data by one or more other active and/or idle UEs in the network. Significant cell-edge performance gain under idealistic scenarios has been reported for UEs employing UL cooperative MIMO communication. However, the modeling of transmission opportunities and resources including power and frequency resources, and determination of cooperative MIMO relay sets to enable cooperative MIMO relay transmissions in a multi-hop scenario is a challenge. Aspects of the present disclosure provide mechanisms to manage various resources to achieve UL cooperative MIMO relaying, including time interlacing, frequency-domain resource allocation, power control, cooperative mode configuration, cooperative set determination, rate prediction, rate request etc.

In certain aspects of the present disclosure, a UE may participate, with one or more other UEs in the network, in cooperative uplink transmission to a base station. A plurality of UEs participating in cooperative uplink transmission to a base station may be grouped in different groups of UE(s), so that each UE belongs to a particular group of UE(s). The base station may transmit mode configurations to each UE, indicating whether or not the UE is configured to transmit data as a data source or relay data received from another UE configured to transmit data as a data source. In an aspect, for each transmission time interval (TTI), the UE may determine at least one operation to perform for the cooperative uplink transmission based, at least in part, on a group number of a group to which the UE belongs and an index of the TTI. In an aspect, the determination of the at least one operation may also be based on received mode configuration (e.g. from a base station) indicating whether or not the UE is to transmit data as a relay. In certain aspects, a cooperative set of UEs for relaying data transmission of a source UE, may be determined based on an exhaustive search algorithm or a fast algorithm (as discussed further).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

For example, as indicated above, a UE (e.g. UE 102) may participate, with one or more other UEs (not shown), in cooperative uplink transmission to a base station (e.g., eNBs, 106 or 108), wherein each UE 102 belongs to a group of UEs. The UE 102 may determine, for a Transmission Time Interval (TTI), at least one operation to perform for the cooperative uplink transmission based, at least in part, on a group number of a group to which the UE 102 belongs and an index of the TTI. One or more eNBs (e.g., 106 and 108) may determine different groups for a plurality of UEs (e.g. UE 102) participating in cooperative uplink transmission to the base station, and transmit mode configurations indicating whether or not UEs in each group are configured to transmit data source or to relay data received from another UE configured to transmit data as a data source. An eNB (e.g., 106 and 108) may determine a cooperative set of UEs to be configured to transmit as relays based on an exhaustive algorithm or fast algorithm discussed further below.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultra book, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, an entertainment device, an appliance, a vehicle/automobile component, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

Figure 2:
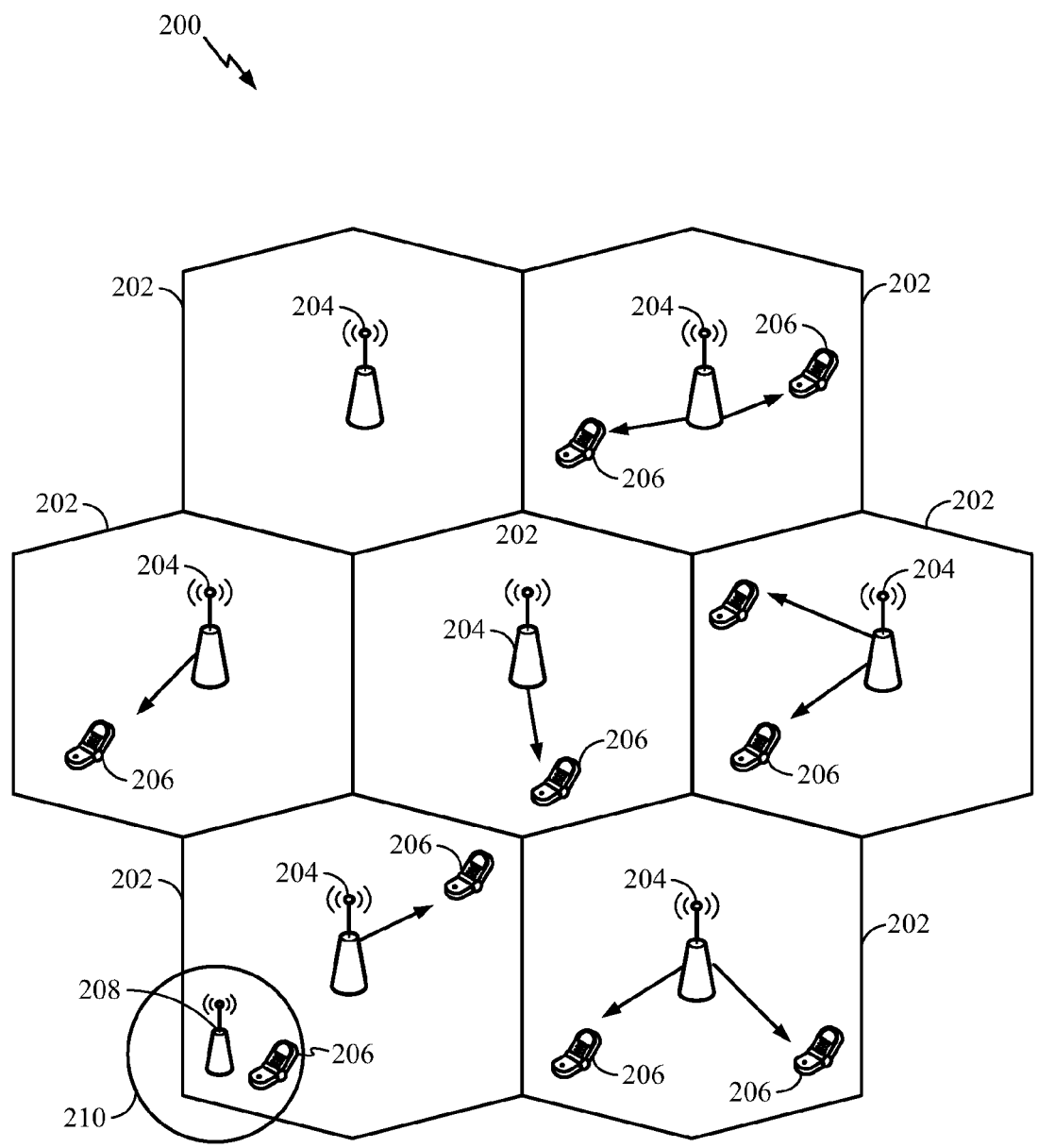
FIG. 2 is a diagram illustrating an example of an access network.

FIG. 2 is a diagram illustrating an example of an access network 200 in an LTE network architecture in which aspects of the present disclosure may be practiced. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200 yet a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, an UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In certain cases, a UE 206 that is at the cell edge of a cell 202 may not efficiently communicate on the UL with its serving eNB 204 due to power limitations, UL interference etc. In certain aspects of the present disclosure, a UE 206 may participate with one or more other UEs in the cell, in cooperative uplink transmission to the serving eNB 204. This may lead to significant cell-edge performance gain. The serving eNB 204 may determine different groups for a plurality of UEs 206 participating in cooperative uplink transmission to the eNB 204, and transmit mode configurations indicating whether or not UEs 206 in each group are configured to transmit data as a data source or to relay data received from another UE 206 configured to transmit data as a data source. Each UE 206 may determine, for each TTI, at least one operation to perform for the cooperative uplink transmission based, at least in part, on a group number of a group to which the UE belongs and an index of the TTI.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
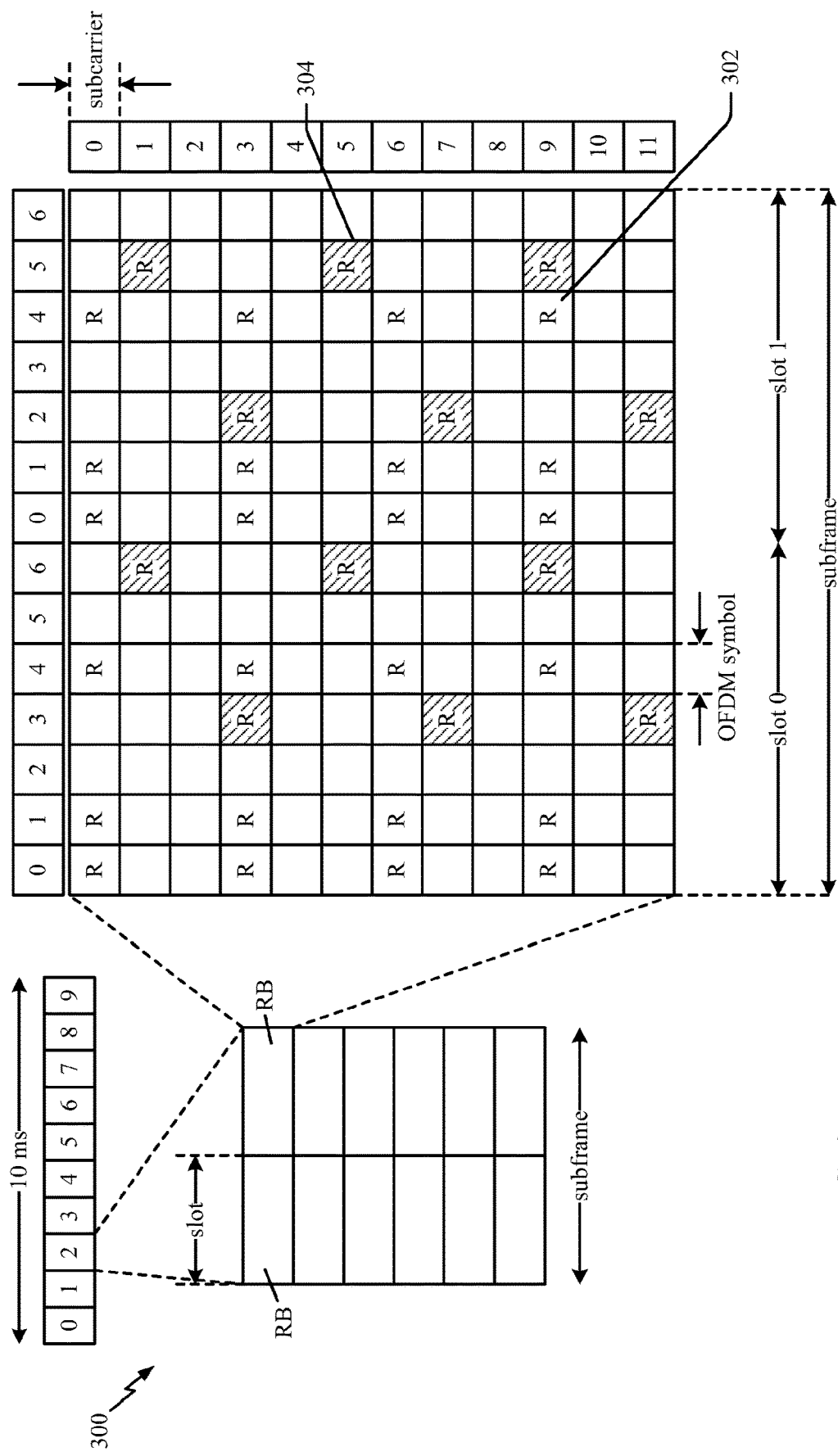
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
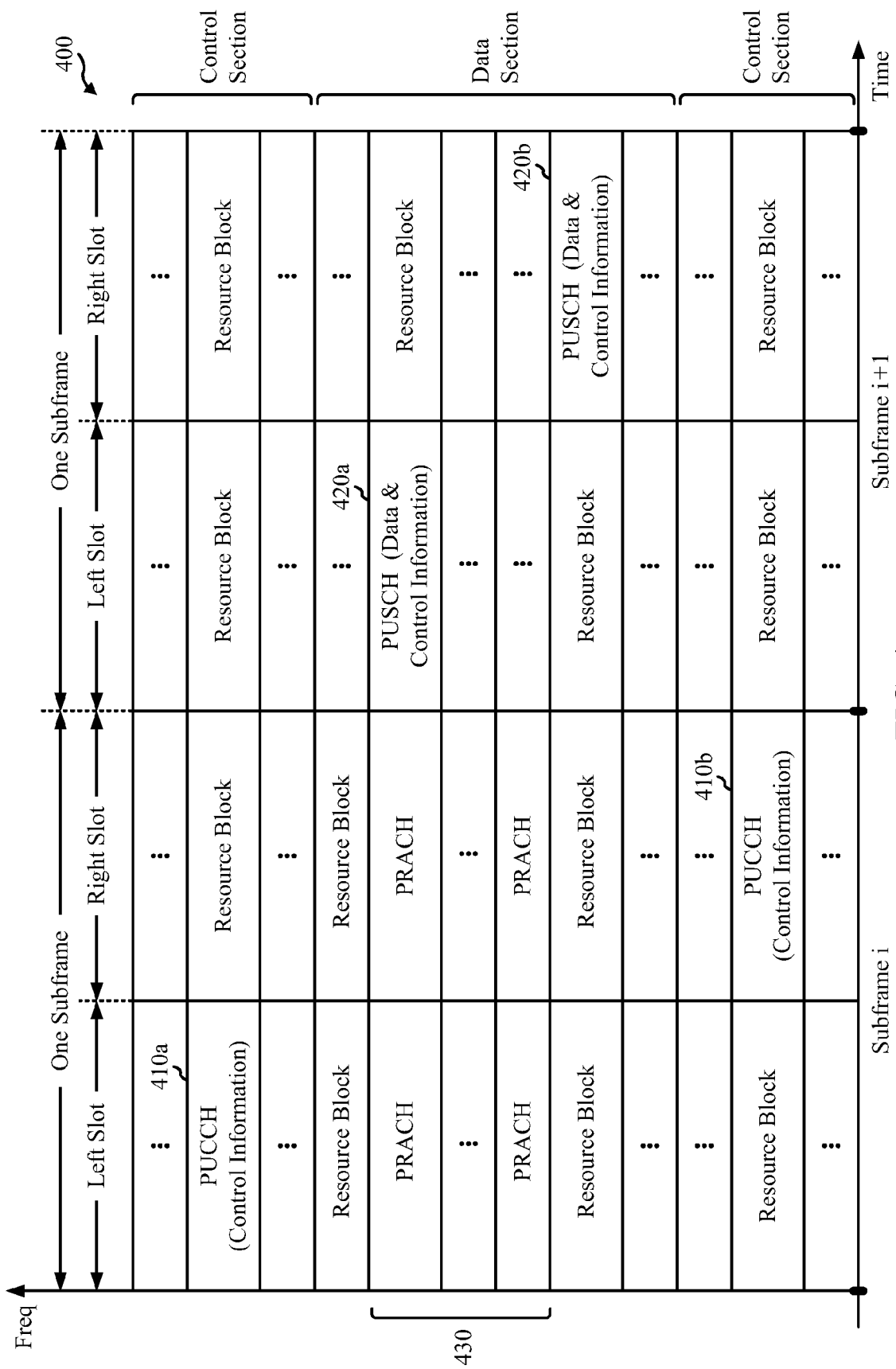
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
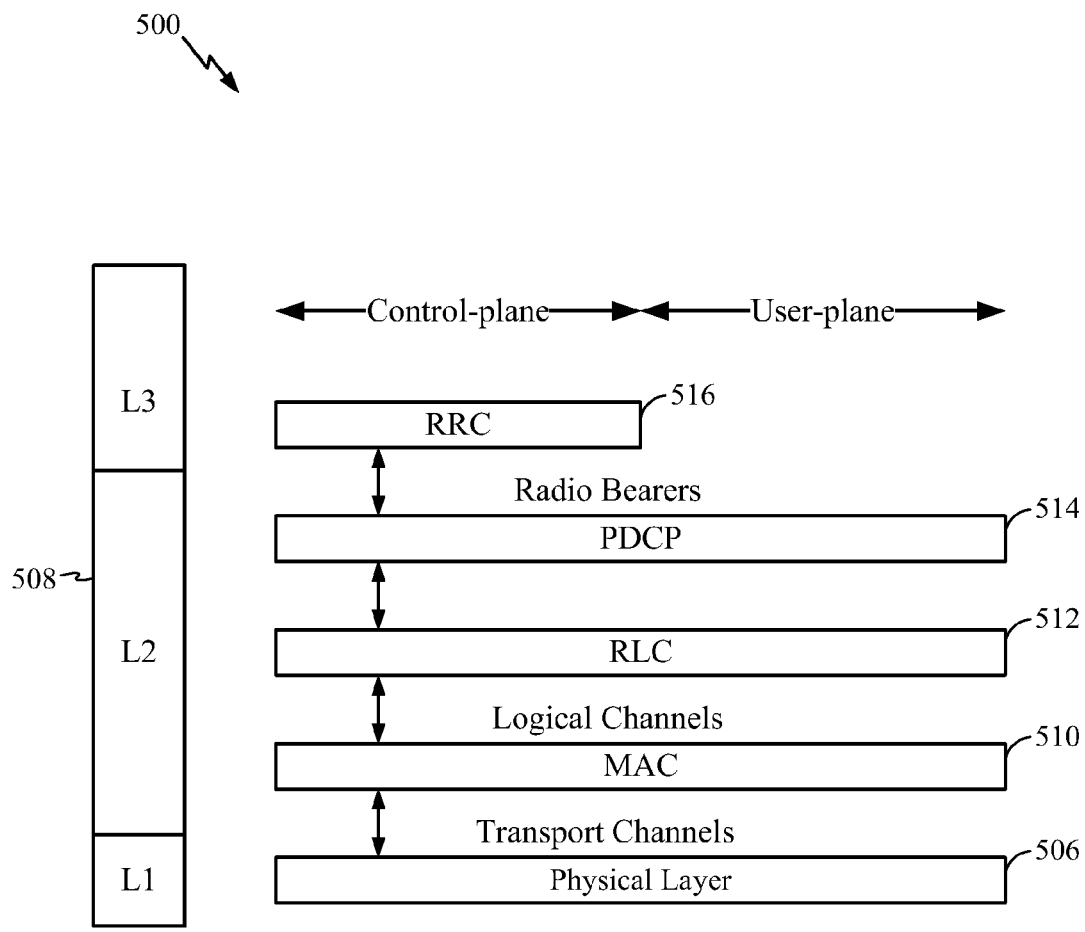
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
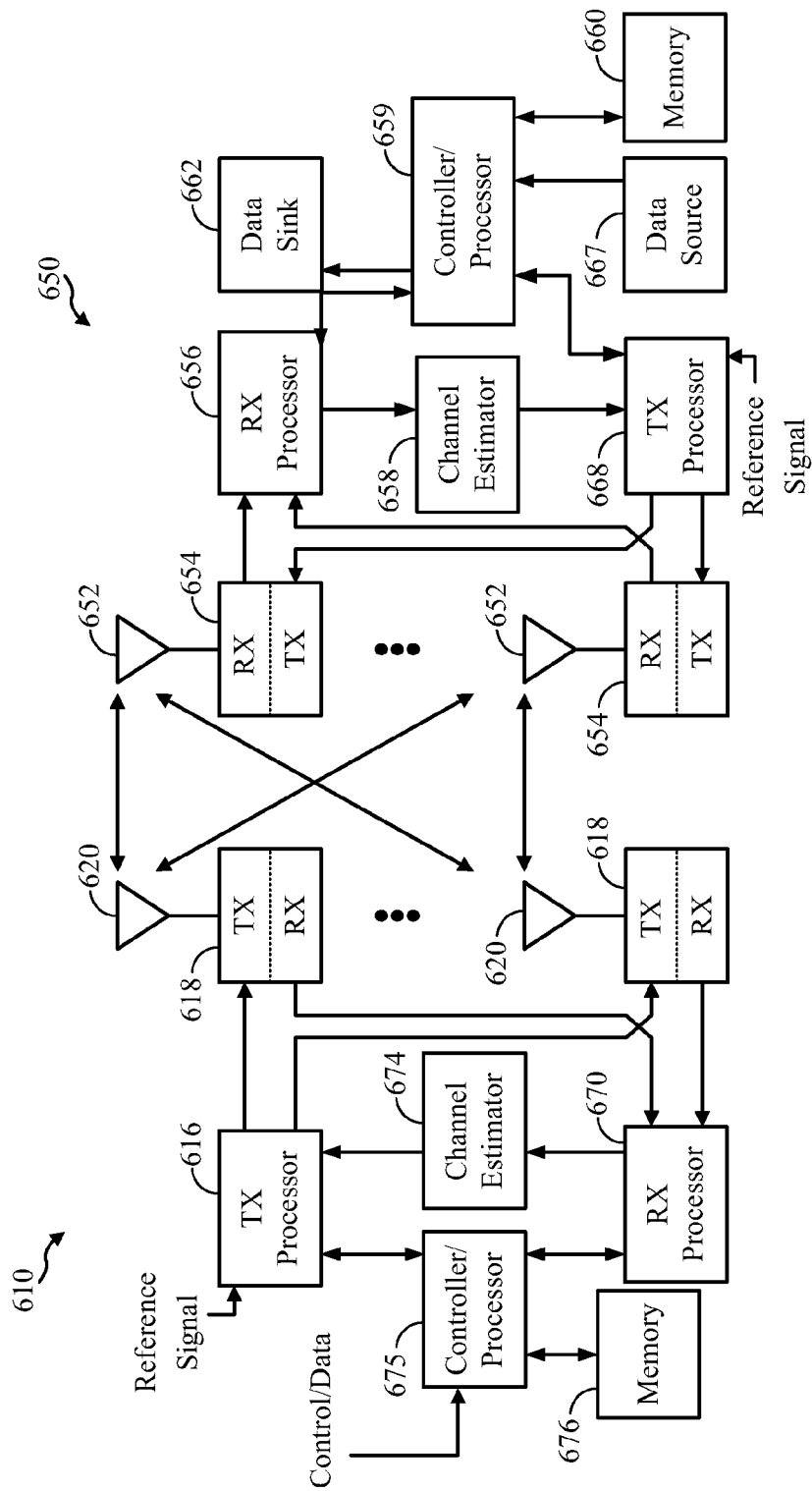
FIG. 6 is a diagram illustrating an example of a base station and user equipment in an access network, in accordance with certain aspects of the disclosure.

FIG. 6 is a block diagram of an eNB 610 in communication with a UE 650 in an access network, in which aspects of the present disclosure may be practiced.

For example, the eNB 610 may determine different groups of a plurality of UEs (e.g., UE 650) participating in cooperative uplink transmission to the eNB 610, and may transmit mode configurations indicating whether or not UEs in each group are configured to transmit data as a data source or to relay data received from another UE configured to transmit data as a data source. The eNB 610 may transmit the group information to the UEs. The UE 650 may participate, with one or more other UEs (not shown), in cooperative uplink transmission to the eNB 610. The UE 650 may determine, for each TTI, at least one operation to perform for the cooperative uplink transmission based, at least in part, on a group number of a group to which the UE belongs and an index of the TTI. Further, as discussed further below, the eNB 610 may determine a cooperative set of UEs to be configured to relay data transmitted by the UE 650, based on at least one of an exhaustive search algorithm or a fast algorithm.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively.

Figure 8:
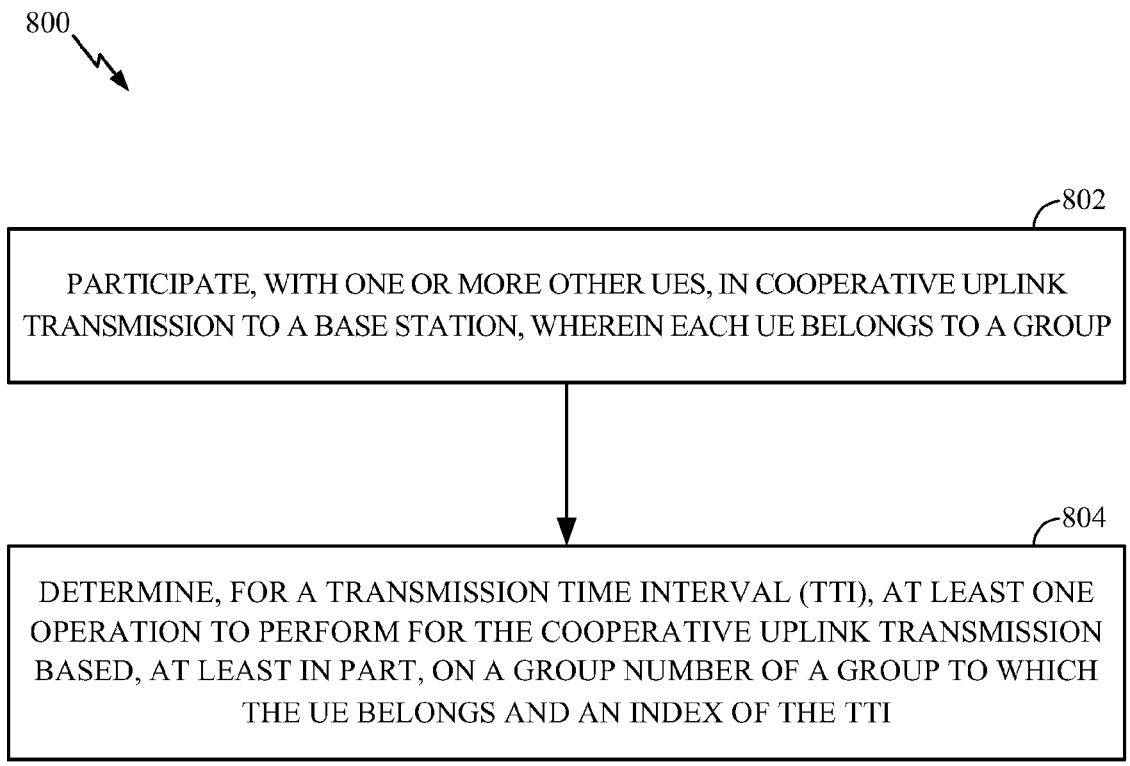
FIG. 8 illustrates example operations performed, for example, by a UE for managing resources for UL cooperative transmission, in accordance with certain aspects of the present disclosure.
Figure 9:
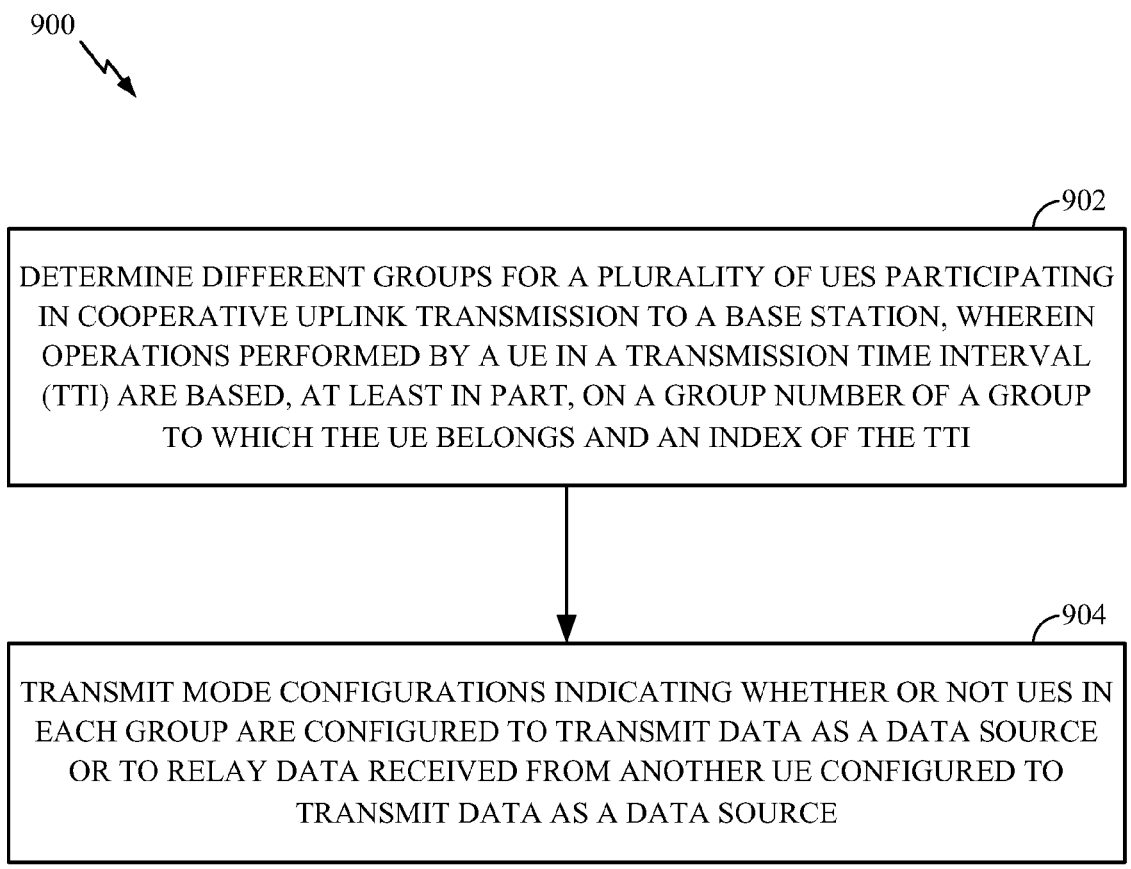
FIG. 9 illustrates example operations performed, for example, by a base station for managing resources for UL cooperative transmission, in accordance with certain aspects of the present disclosure.

The controller/processor 675 and/or other processors and modules at the eNB 610 may perform or direct operations, for example, operations 900 in FIG. 9, and/or other processes for the techniques described herein for managing resources for UL cooperative transmission. The controller/processor 659 and/or other processors and modules at the UE 650 may perform or direct operations, for example, operations 800 in FIG. 8, and/or other processes for the techniques described herein for managing resources for UL cooperative transmission. In certain aspects, one or more of any of the components shown in FIG. 6 may be employed to perform example operations 800 and 900 and/or other processes for the techniques described herein. The memories 660 and 676 may store data and program codes for the UE 650 and eNB 610 respectively, accessible and executable by one or more other components of the UE 650 and the eNB 610.

Managing Resources for Cooperative Uplink Transmission

Certain aspects of the present disclosure provide mechanisms for managing resources for cooperative uplink transmissions, whereby UEs are placed in different groups. UEs in different groups may perform different operations in different time slots or transmission time intervals (TTIs). In other words, the particular operation performed by a given UE in a given TTI may depend, both on the group to which the UE belongs, as well as a TTI index.

Figure 7:
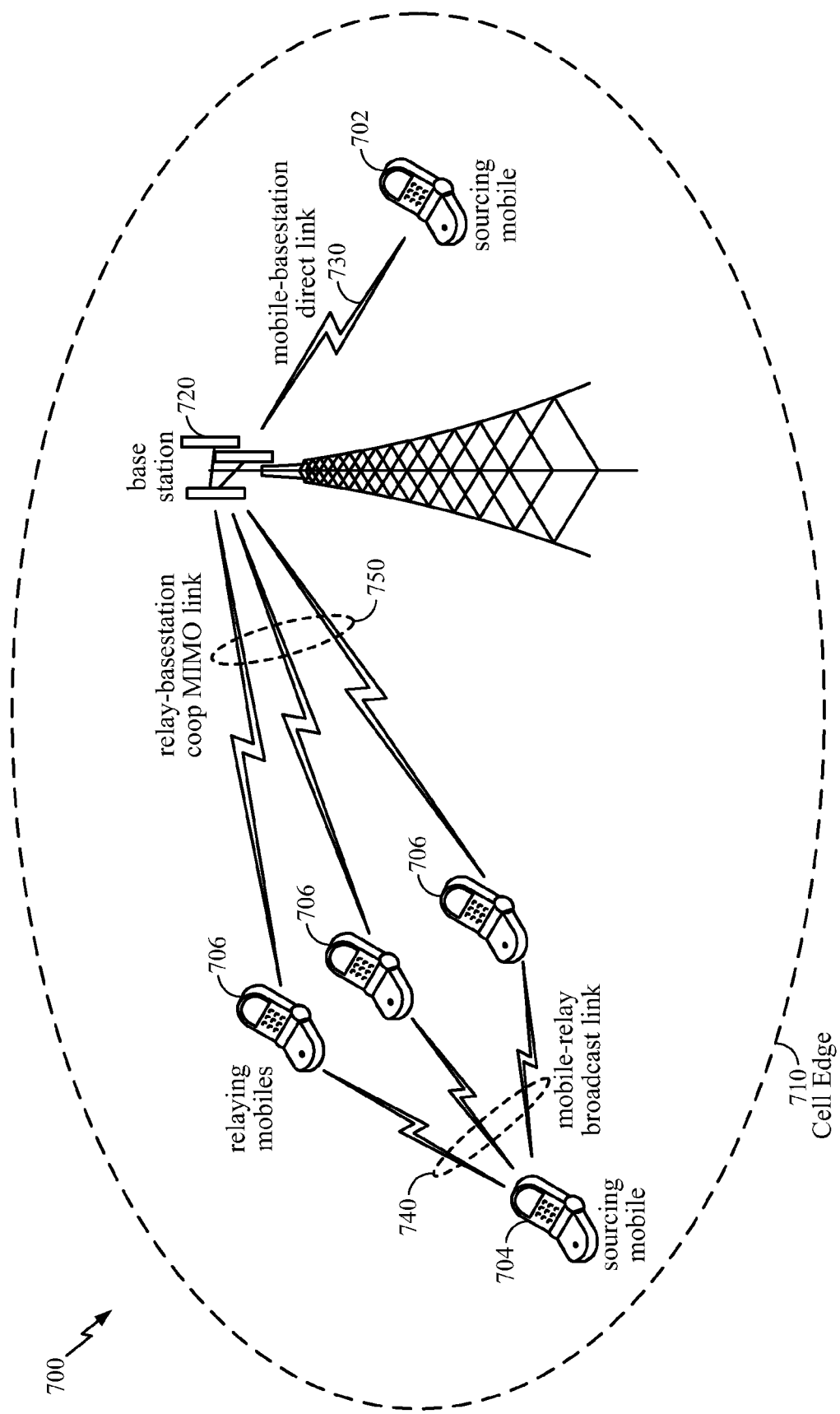
FIG. 7 illustrates a wireless communication network 700 employing uplink cooperative MIMO relaying, in accordance with certain aspects of the present disclosure.

FIG. 7 illustrates a wireless communication network 700 employing uplink cooperative MIMO relaying, in accordance with certain aspects of the present disclosure. A mobile node (e.g., UE) may generally be able to transmit UL data on a direct link to a base station at acceptable data rates, when operating within cell 710. For example, as shown in FIG. 7, sourcing mobile node 702, which is well within the cell 710, may communicate UL data to base station 720 (e.g., eNB) on a mobile-base station direct link 730.

However, a mobile node operating at cell-edge may not efficiently communicate UL data to a base station at acceptable data rates, for e.g., due to power constraints, UL interference from other stronger UEs in the vicinity etc. For example, sourcing mobile node 704, shown at the edge of cell 710, may not efficiently communicate UL data to base station 720, e.g., due to power constraints or due to UL interference from neighboring mobile nodes (e.g., mobile nodes 706). In certain aspects, the sourcing mobile node 704 may communicate UL data to the base station 720 using intermediary relay mobile nodes (e.g., relay mobile nodes 706) to relay the data transmitted by the mobile node 704.

As shown in FIG. 7, the sourcing mobile node 704 may broadcast UL data on a mobile-relay broadcast link 740. The relay mobile nodes 706 may receive this transmission of UL data from sourcing mobile node 704, and may cooperatively forward this transmission to the base station 720 on a relay-base station cooperative MIMO link 750. In certain aspects, the UL data transmission of sourcing mobile node 704 may be transmitted to the base station 720 over multiple hops. For example, the relay mobile nodes 706 may forward the data transmission to another group of relay nodes (not shown), which may then forward the data transmission to the base station 720.

In certain aspects of the present disclosure, a UE (e.g., mobile node 704) may participate, with one or more other UEs (e.g., relay mobile nodes 706) in the network, in cooperative uplink transmission to a base station (e.g., base station 720). As noted above, according to certain aspects, a plurality of UEs participating in cooperative uplink transmission to a base station may be grouped in different groups of UE(s) (e.g., by the base station), so that each UE belongs to a particular group of UE(s). In an aspect, four groups (u) of UE(s) with group indices u=0, 1, 2, 3 may be defined. In certain aspects, the base station may transmit mode configurations to each UE, indicating whether or not the UE is configured to transmit data as a data source or relay data received from another UE configured to transmit data as a data source.

In an aspect, for each transmission time interval (TTI), the UE may determine at least one operation to perform for the cooperative uplink transmission based, at least in part, on a group number of a group to which the UE belongs and an index of the TTI. In some cases, the determination of the at least one operation may also be based on received mode configuration (e.g. from a base station) indicating whether or not the UE is to transmit data as a relay.

FIG. 8 illustrates example operations 800 performed, for example, by a UE (e.g., one of the UEs 702, 704, or 706 shown in FIG. 7) for managing resources for UL cooperative transmission, in accordance with certain aspects of the present disclosure. Operations 800 may begin, at 802, by participating, with one or more other UEs, in cooperative uplink transmission to a base station, wherein each UE belongs to a group. At 804, the UE may determine, for a TTI, at least one operation to perform for the cooperative uplink transmission based, at least in part, on a group to which the UE belongs and an index of the TTI.

FIG. 9 illustrates example operations 900 performed, for example, by a base station (e.g., BS 720 shown in FIG. 7) for managing resources for UL cooperative transmission, in accordance with certain aspects of the present disclosure. Operations 900 may begin, at 902, by determining different groups for a plurality of UEs participating in cooperative uplink transmission to the base station, wherein operations performed by a UE in a TTI is based, at least in part, on a group number of a group to which the UE belongs and an index of the TTI. At 904, the base station may transmit mode configurations indicating whether or not UEs in each group are configured to transmit data as a data source or to relay data received from another UE configured to transmit data as a data source.

The various operations that the UE may perform in any given TTI include transmitting data as a data source, receiving data from another UE transmitting as a data source, decoding data received from another UE transmitting as a data source, or transmitting data as a relay. In an aspect, the UE may receive information regarding the group number of the group to which the UE belongs, for example, from the base station.

In an aspect, the at least one operation a UE may perform for a particular TTI may be determined by the UE based on a modulus function involving the group number to which the UE belongs and the index of the TTI. Further, the modulus function may be based on a number of different TTI indices (or interlaces, e.g., mod 4 for 4 TTI interlaces). In an example scenario, four UE groups may be defined with group indices u=0, 1, 2, 3, and four TTI interlaces may be defined with indices t=0, 1, 2, 3. The operation of the UE for a particular TTI may be given by the expression (t−u) mod 4. In an aspect, if (t−u) mod 4=0, the UE may transmit data as a data source. If (t−u) mod 4=1, the UE may receive data from another UE transmitting as a data source. If (t−u) mod 4=2, the UE may either decode data received from another UE transmitting as a data source or transmit data as a data source. Finally, if (t−u) mod 4=3, the UE may transmit data as a relay.

Table-1 below shows an example time line for operations to be performed by UEs in different groups (in the example, Groups 0-3 are shown) in a particular TTI based on the group to which it belongs and a TTI index (in the example, indices 0-7 are shown). In the example shown in Table-1, Tx denotes the UE transmitting data as a data source, Rx denotes the UE receiving data from another UE transmitting as a data source, D denotes the UE decoding data received from another UE transmitting as a data source, and $T_R$ denotes the UE transmitting as a relay.

TABLE 1

| UE | TTI | | | | | | | |
|---|---|---|---|---|---|---|---|---|
| | 0 | 1 | 2 | 3 | 4 | 5 | 6 | 7 |
| 0 | Tx | Rx | D/Tx | $T_R$ | Tx | Rx | D/Tx | $T_R$ |
| 1 | $T_R$ | Tx | Rx | D/Tx | $T_R$ | Tx | Rx | D/Tx |
| 2 | D/Tx | $T_R$ | Tx | Rx | D/Tx | $T_R$ | Tx | Rx |
| 3 | Rx | D/Tx | $T_R$ | Tx | Rx | D/Tx | $T_R$ | Tx |

Figure 10:
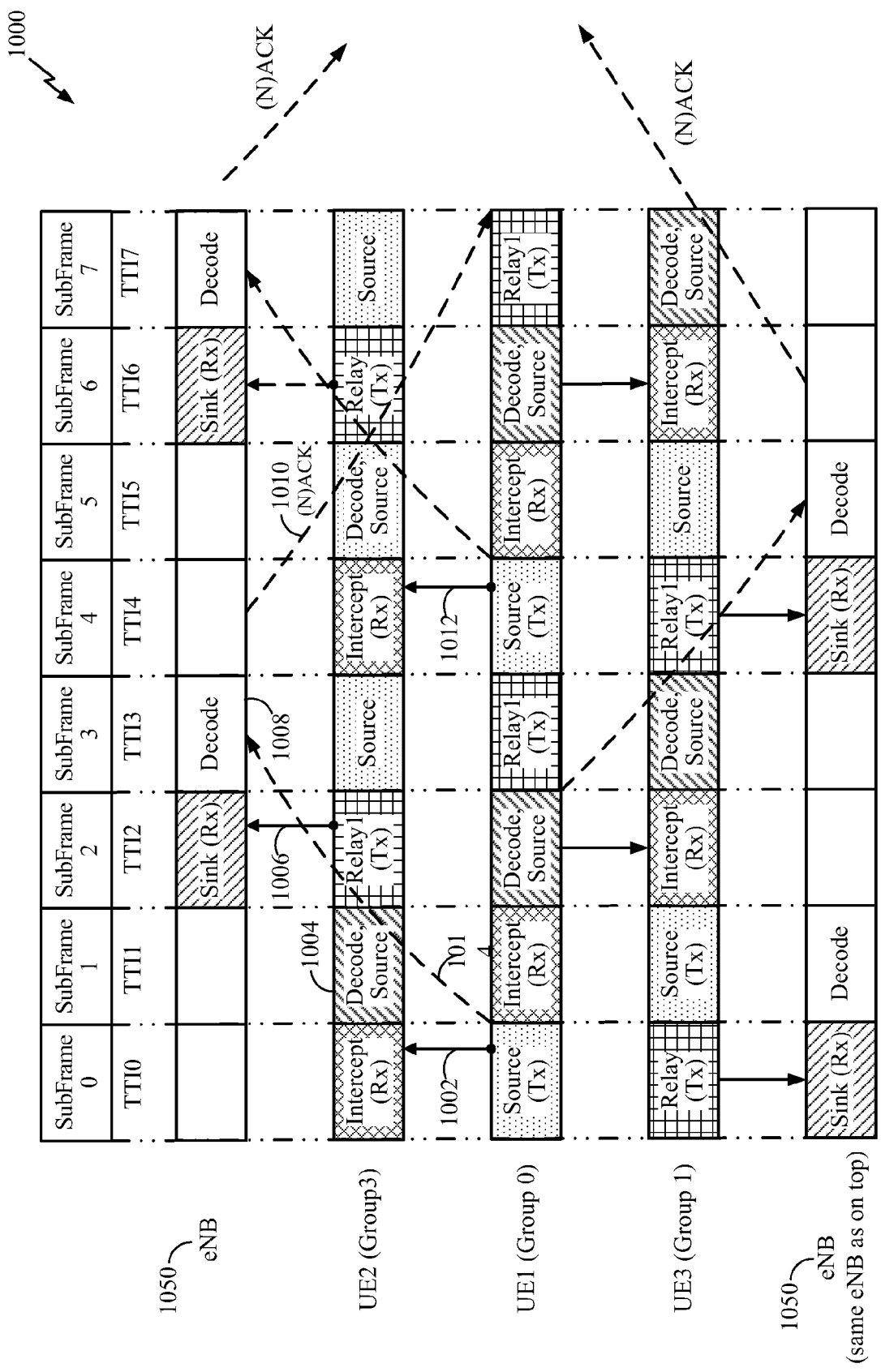
FIG. 10 illustrates an example time line of operations performed by UEs belonging to different UE groups for each TTI, and participating in cooperative uplink transmission to a base station, in accordance with certain aspects of the present disclosure.

FIG. 10 illustrates an example time line 1000 of different operations performed by UEs belonging to different UE groups for each TTI, and participating in cooperative uplink transmission to a base station, in accordance with certain aspects of the present disclosure. In FIG. 10, each subframe corresponds to a TTI, and thus, subframe indices 0-7 correspond to TTI indices 0-7. UE 1 belongs to UE group 0, UE 2 belongs to UE group 3, and UE 3 belongs to UE group 1. Each of the UEs 1-3 may participate in cooperative uplink transmission to eNB 1050. Further, in FIG. 10, Rx denotes receiving data (by a UE relay or eNB) and Tx denotes transmitting data (by source UE or relay UE).

It may be noted that the time line for each UE 1-3 adheres to the time line of Table-1 for UE groups 0, 1, and 3 respectively. Following the timeline of UE 1 (group #0) as an example, at TTI 0 (subframe 0), the UE 1 transmits (1002) a packet as a data source and the packet is intercepted by relay UE 2 (group #3). At TTI 1 (subframe 1), relay UE 2 decodes (1004) the packet that was intercepted at TTI 0. At TTI 2 (subframe 2), the relay UE 2 re-transmits (1006) the successfully decoded the packet and the eNB 1050 receives the re-transmitted packet. At TTI 3 (subframe 3), the eNB 1050 decodes (1008) the packet re-transmitted by the relay UE 2 during the previous interlace. At TTI 4 (subframe 4), the eNB 1050 sends (1010) ACK/NACK feedback to the UE 1 that sourced the data packet during TTI 0.

As shown in FIG. 10, UE 1 may start another cycle at subframe 4 by transmitting (1012) another data packet to UE 2. FIG. 10 also shows UE 1 sending data packets to eNB 1050 via UE 3 (group 1). As shown UE 1 sources data packets to UE 3 at TTI 2 and TTI 6.

Although not shown in FIG. 10, each of UEs 1-3 may transmit as a data source or relay data transmitted from another UE. For example, UE 2 may transmit data to eNB 1050 via UE 1 or UE 3. Further, each UE may transmit data to the eNB 1050 using multiple relay UEs cooperatively forwarding the source data to the eNB 1050. For example, at subframe 0, UE 1 may simultaneously transmit a source data packet to UE 2 and another UE 2' (not shown) belonging to the same group 3. Both UE 2 and UE 2' may decode and forward the source data packet to eNB 1050.

In addition, although not shown in FIG. 10, each UE 1-3 may transmit its source data to the eNB 1050 over multiple hops. For example, at subframe 2, UE 2 may re-transmit source data transmitted by UE1 to UE3, and the UE 3 may intercept the re-transmitted data from UE2. UE 3 may then decode the re-transmitted data at subframe 3 and re-transmit again at subframe 4 to eNB 1050.

In certain aspects, a UE may decide to transmit data on a direct link to the eNB 1050, for example, based on signaling received from the eNB 1050. As shown in FIG. 10, at TTI 0, UE1 transmits data directly (1014) to the eNB 1050. As shown, the eNB 1050 receives the data at TTI 3, and transmits (1010) an ACK/NACK feedback to the UE1 at TTI 4 that is received by the UE1 at TTI 7.

In certain aspects, for each TTI, the base station may allocate frequency resources for an operation to be performed by a UE, and signal the allocation to the UE. The UE may determine frequency resources for one or more operations in each TTI based on the allocation. In an aspect, different frequency resources are allocated (e.g., by the base station) to different UEs transmitting in a same TTI. In certain aspects, the frequency allocation may include allocating each subband, in each TTI, to UEs for either sourcing or relaying data to the base station, for example based on link conditions between each of the UEs and the base station. Further, a set of cooperative relay UEs relaying data transmitted from the same data source UE, may be allocated the same subband.

Figure 11:
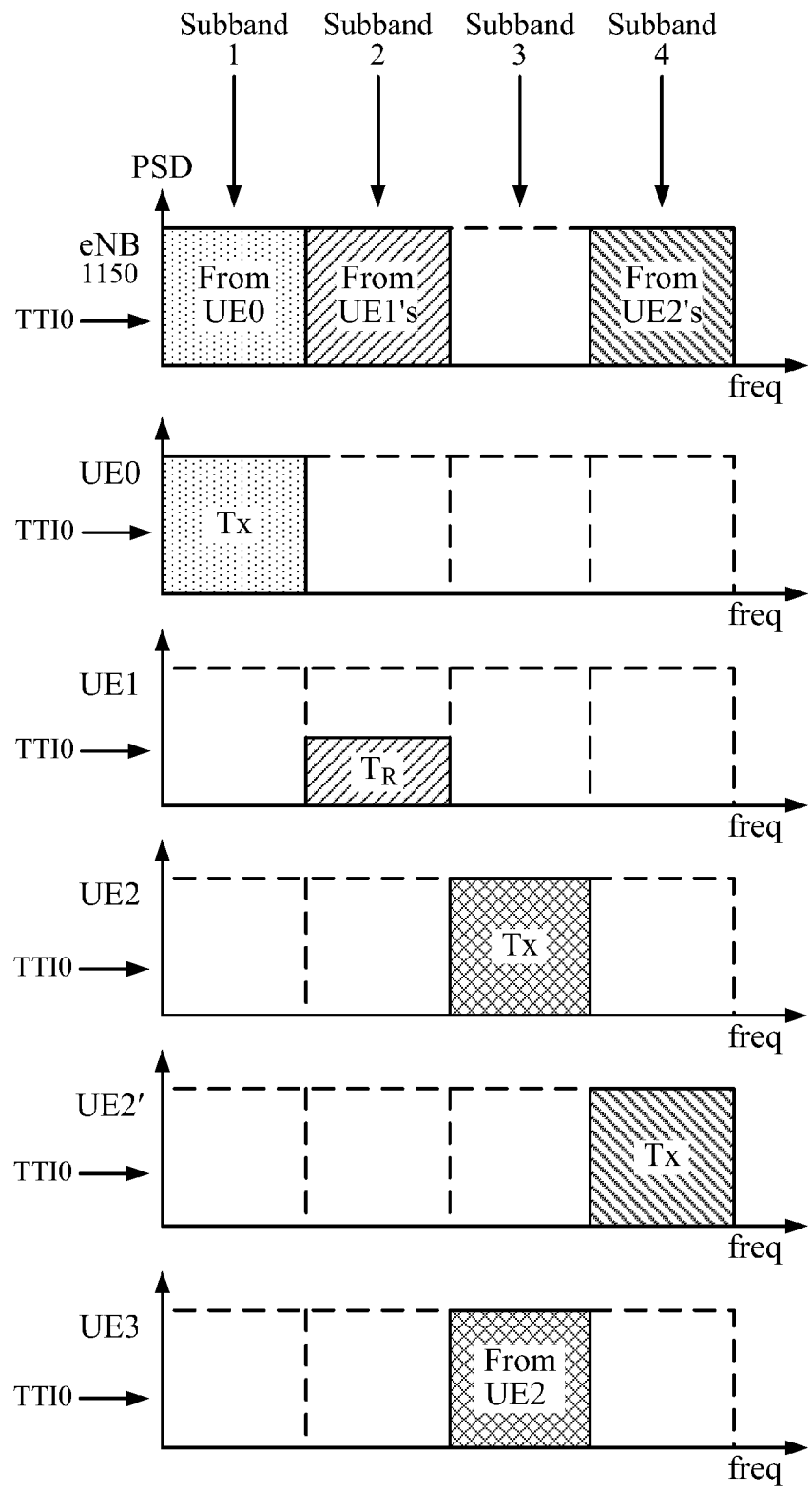
FIG. 11 illustrates allocation of frequency resources to UEs participating in cooperative UL transmission to a base station (e.g., eNB), in accordance with certain aspects of the present disclosure.

FIG. 11 illustrates allocation of frequency resources to UEs participating in cooperative UL transmission to a base station (e.g., eNB), in accordance with certain aspects of the present disclosure. FIG. 11 shows frequency subbands 1-4 allocated to each of the UEs 0, 1, 2, 2', and 3 in the same TTI (e.g., TTI 0 shown in FIG. 11). As shown in FIG. 11, in the same TTI 0, each subband is allocated a UE for transmitting data as a data source (Tx), for transmitting data as a rely ($T_R$), or receiving data (e.g., as a relay) transmitted from another UE that is transmitting as a data source. For example, subband 1 is allocated to UE0 for transmission as a data source (e.g., direct transmission to eNB), subband 2 is allocated to UE1 for transmission as a relay (e.g., re-transmitting data from another data source), subband 3 is allocated to UE2 for transmission as a data source, for example to UE3 which is also allocated subband 3 for receiving data from UE2 for further re-transmission as a relay, and subband 4 is allocated to UE 2' for transmission as a data source (e.g., direct transmission to eNB). In an aspect, UE2 and UE2' may be in the same UE group.

In certain aspects, a UE may be allocated power (e.g., by the base station) for a TTI based, at least in part, on whether the UE is transmitting data as a data source or transmitting data as a relay. For example, a UE transmitting data as a data source may be allocated normal power spectral density (PSD), e.g., open loop power control. On the other hand, a UE transmitting data as a relay may be allocated a lower PSD in order to maintain similar IoT as UL baseline.

Figure 12A:
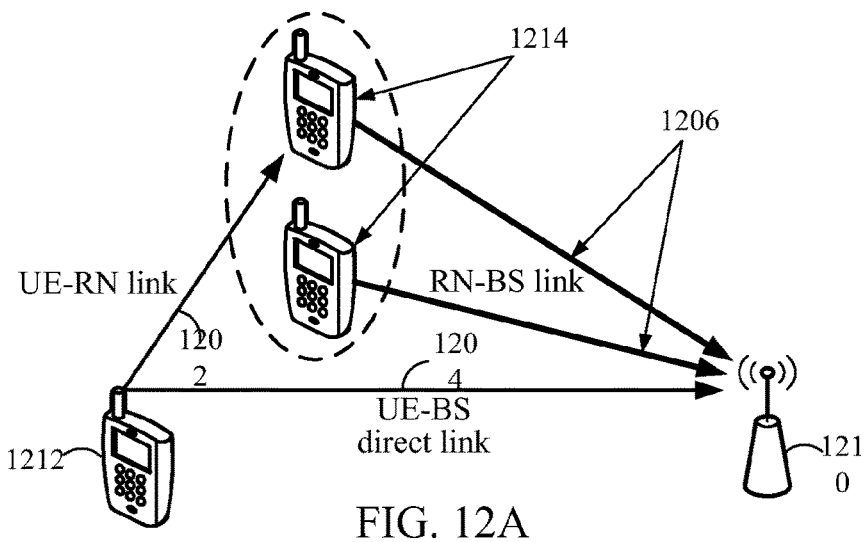
FIGS. 12A-12C illustrate graphical representations of achievable data rates for UE/MS-RN, RN-BS and UE/MS-RN-BS links, in accordance with certain aspects of the present disclosure.

In certain aspects, as illustrated in FIG. 12A, a base station 1210 may predict supportable data rates between UEs, for example, between a source UE 1212 and relay UE 1214 (e.g., UE-RN link 1202), between a relay UE 1214 and the base station 1210 (e.g., RN-BS link 1206), and for a direct link between a source UE 1212 and the base station 1210 (e.g., UE-BS link 1204), based on channel state information for the UE-RN link 1202, RN-BS link 1206 and the UE-BS link 1204 respectively. In other words, the base station 1210 may make a decision on how to group and configure UEs (e.g., UEs 1212 or 1214) based on the data rates supported by different data paths, for example, including an aggregate of multiple data paths through relays as well as a direct path from a UE (e.g., 1212) to the BS 1210.

In an aspect the base station 1210 may measure CSI for the RN-BS link 1206 and UE-BS link 1204. CSI for the UE-RN link 1202 may be measured by the source UE 1212 or the relay UE 1214 and reported to the base station 1210. In certain aspects, the base station 1210 may combine the data rates for the UE-RN link 1202 and the RN-BS link 1206 to determine a combined UE-RN-BS link rate. In an aspect, the combined UE-RN-BS link rate may be defined as a minimum of the UE-RN link rate and the RN-BS link rate.

In certain aspects, the base station 1210 may decide whether or not a UE 1212 or 1214 is configured to transmit data as a data source or relay data received from another UE configured to transmit data as a data source, based on a comparison of predicted data rate for a direct link between the UE 1212 or 1214 and the base station 1210 and a predicted data rate for one or more links between the UE 1212 or 1214 and the base station 1210 via one or more UEs configured to transmit data as a relay.

Figure 12B:
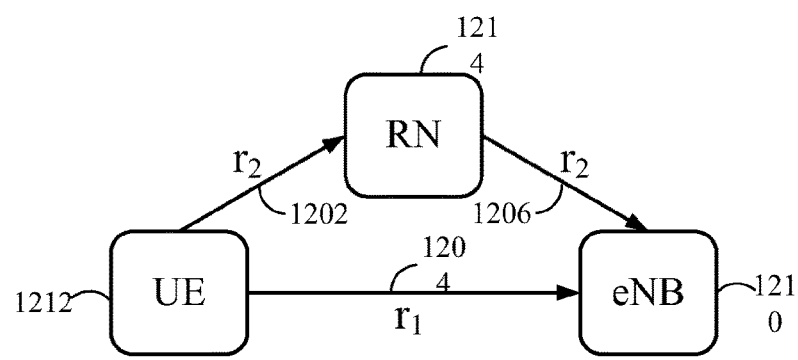

According to certain aspects, the base station 1210 may compare achievable effective data rates of a direct UE-BS link 1204 and a combined UE-RN-BS link. For example, referring to FIG. 12B, the base station 1210 may determine whether to configure UEs for relaying or not by comparing a rate of a UE-BS direct link 1204 (e.g., rate r1) to an achievable effective rate of a UE-RN-BS link (e.g., in a simplified example, r2/2-assuming a same rate r2 at each of the UE-RN link 1202 and RN-BS link 1206 is required to traverse the path through the relay).

Based on this determination, the base station 1210 may configure the UEs accordingly, for example by signaling a mode configuration to each UE. The mode configurations may be signaled, for example, to a UE and/or RN via L1 signaling, MAC layer signaling, or RRC signaling.

In certain aspects, determining a group of UEs may include determining a cooperative set of UEs configured to relay data received from another UE. In an aspect, one or more UEs may be determined to be in a cooperative set of relay UEs based on predicted data rate for links between the UEs in the set and the UE transmitting as a data source and the predicted data rate for one or more links between the UEs in the set and the base station.

Figure 12C:
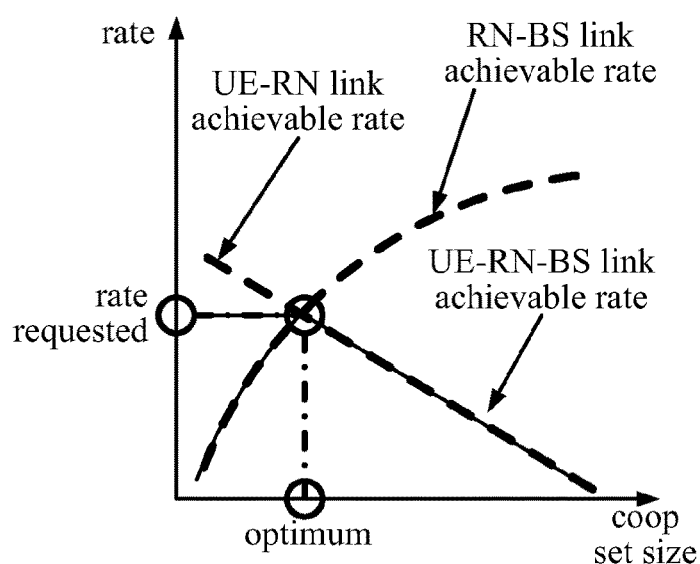

FIG. 12C illustrates a graphical representation of achievable data rates for UE-RN, RN-BS and UE-RN-BS links with increasing size of a set of cooperative relay UEs, in accordance with certain aspects of the present disclosure. As shown in the graph of FIG. 12C, the data rate for the MS-RN link is a decreasing function of the cooperative set size of UE relays, for example, since the data rate of the MS-RN link is typically the minimum of the data rates between the MS and each RN. The data rate for the RN-BS link is an increasing function of the cooperative set size of UE relays, for example, because of diversity or multiplexing of more UE relays a higher rate may be achieved.

However, as shown in FIG. 12C, the data rate for the MS-RN-BS link increases to a certain level and then starts to decrease with increasing set size of UE relays. Thus, in an aspect, the goal is to have set size of relay UEs that would enable achieving an optimum highest achievable MS-RN-BS link rate. As shown in FIG. 12C, the optimum achievable MS-RN-BS link rate may be achieved at the intersection of the curves for the MS-RN link rate and the RN-BS link rate. In certain aspects, a cooperative set of relay UEs may be determined by sorting UEs based on their predicted data rates (e.g., MS-RN link rates), and selecting UEs to include in the set based on an analysis of the predicted data rates of the sorted UEs.

In an example exhaustive search algorithm for determining the cooperative set of relay UEs for relaying data transmitted from a data source UE, the UE-RN link rates for each potential relay UE may be sorted and arranged in descending order. Starting with the UE having the strongest UE-RN link rate, the UE-RN-BS link for each potential relay UE may be evaluated one by one. UEs may be added in the cooperative set of relay UEs until the highest combined MS-RN-BS link rate (optimum rate) is found, thus determining an optimum set of relay UEs. As noted above, the MS-RN-BS link rate may be defined as the minimum of the rates for the MS-RN link and the RN-BS link.

In certain aspects, the exhaustive search algorithm provides optimum rate while the cooperative set may not necessarily be unique. From system performance point of view, it may be desirable to utilize a more efficient mechanism for achieving a more compact (or "tighter") cooperative group of a limited number of UEs. In other words, while this tighter group may be less than optimal, in some cases, the performance may be comparable, and achieved with reduced signaling overhead, implementation complexity, mobile battery life, interference, and the like.

While a brute force method to find an optimal tight cooperative set may include using an exhaustive search algorithm, this may come at the expense of complexity exponentially increasing with the number of relay UEs in the set. Thus, there is a need for a tighter and faster algorithm for determining the cooperative set of relay UEs.

According to certain aspects, a faster algorithm to achieve a cooperative set may involve initializing a set of potential relay based on an efficient analysis of predicted achievable data rates for paths between a source UE and potential relay UEs, as well as the achievable data rates for paths between the potential relay UEs and a target base station.

Figure 13:
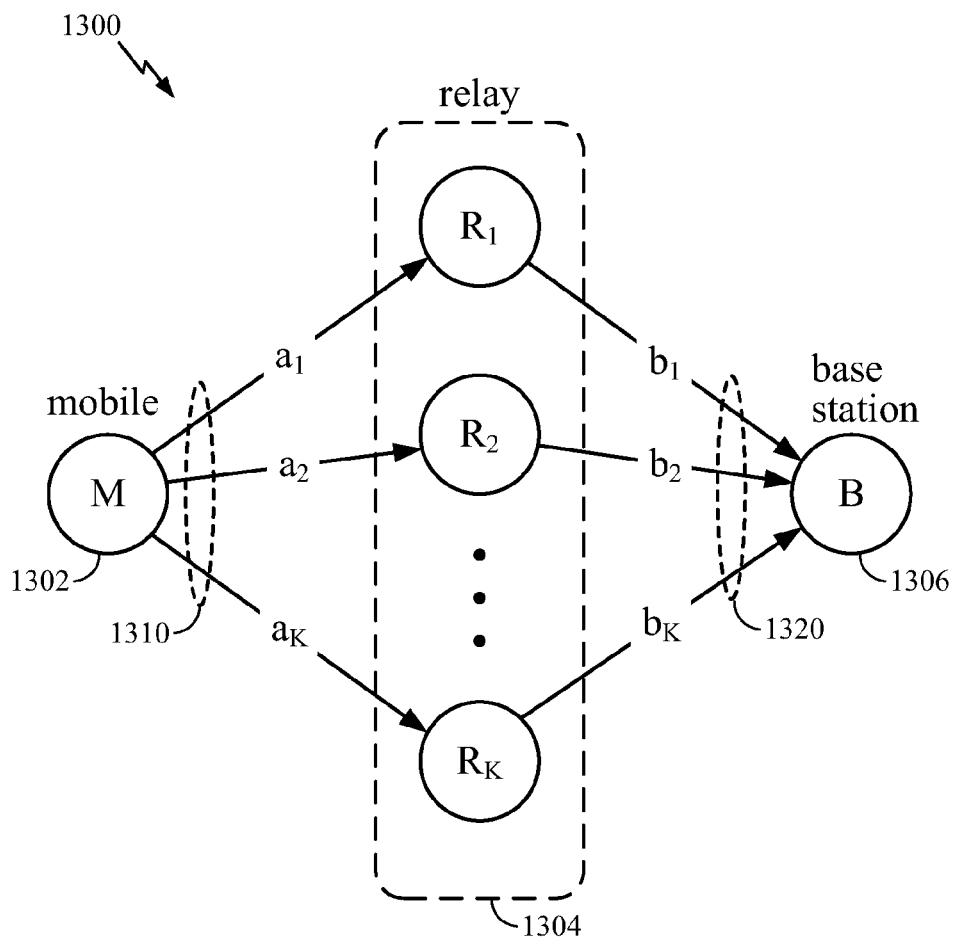
FIG. 13 illustrates determination of a cooperative set of relay UEs based on predicted data rates, in accordance with certain aspects of the present disclosure.

For example, FIG. 13 illustrates an example technique for determination of a cooperative set of relay UEs based on predicted data rates on different data paths, in accordance with certain aspects of the present disclosure. FIG. 13 shows a mobile station (or UE) 1302 communicating UL data to a base station 1306 via a set of relay UEs 1304 that cooperatively forward the data transmission of UE 1302 to the base station 1306. $a_1$-$a_k$ denote predicted data rates of links 1310 between the UE 1302 and each of the relay UEs $R_1$-$R_k$ respectively (UE-RN links). $b_1$-$b_k$ denote predicted data rates of links 1320 between each of the relay UEs $R_1$-$R_k$ and the base station 1306 (RN-BS links).

In certain aspects, a faster algorithm to determine a tighter cooperative set of relay UEs 1304 (e.g., compared to the exhaustive search algorithm) may include forward set expansion and backward shrinkage. The forward set expansion may begin by initialization including sorting, in a first step, relay nodes so that the predicted UE-RN link rates $\{a_k\}$'s are in descending order. In a second step, a cooperative set I is initialized as I={1}, a variable k is initialized to k=1, the UE-RN link rate $a_S$ is initialized as $a_S=a_1$, the RN-BS link rate $b_S$ is initialized as $b_S=b_1$, and a rate variable $r_S$ is initialized as $r_S=$. The third and fourth steps employ set expansion. The third step increments k←k+1, and sets $a_S=a_k$ and $b_S\leftarrow b_S=b_k$. In the fourth step, if $r_S<\min\{a_S,b_S\}$, the set I←I U {k}, and $r_S=\min\{a_S,b_S\}$. The third and fourth steps are iteratively repeated until the last relay node with the lowest MS-RN link rate $a_k$ is considered.

Then, backward set expansion may begin by initialization including sorting, in a fifth step, the relay nodes from the solution of the forward expansion so that the predicted RN-BS link rates $\{b_L\}$'s are in ascending order. In a sixth step, a set J is initialized as J=I (from the forward expansion), and L is initialized to L=1. The seventh and eighth steps employ set shrinkage. Seventh step sets $b_S\leftarrow b_S-b_L$. In the eighth step, if $b_S\geq r_S$, J←J−{L}, and L←L+1. Steps are iteratively repeated until a tight cooperative set of relay UEs 1304 is achieved.

In certain aspects, cooperative MIMO transmission has the potential to improve UL coverage and capacity. In an aspect, a system may be configured as cooperative SISO relaying to tradeoff among complexity, signaling overhead and performance.

In certain aspects, idle mobiles, when available, have the potential to improve system performance further. MIMO relaying via idle mobiles may be employed for flexibility/complexity considerations. In certain aspects, gain from cooperative MIMO transmission increases with the number of mobile nodes, either active or idle relaying nodes.

Figure 14:
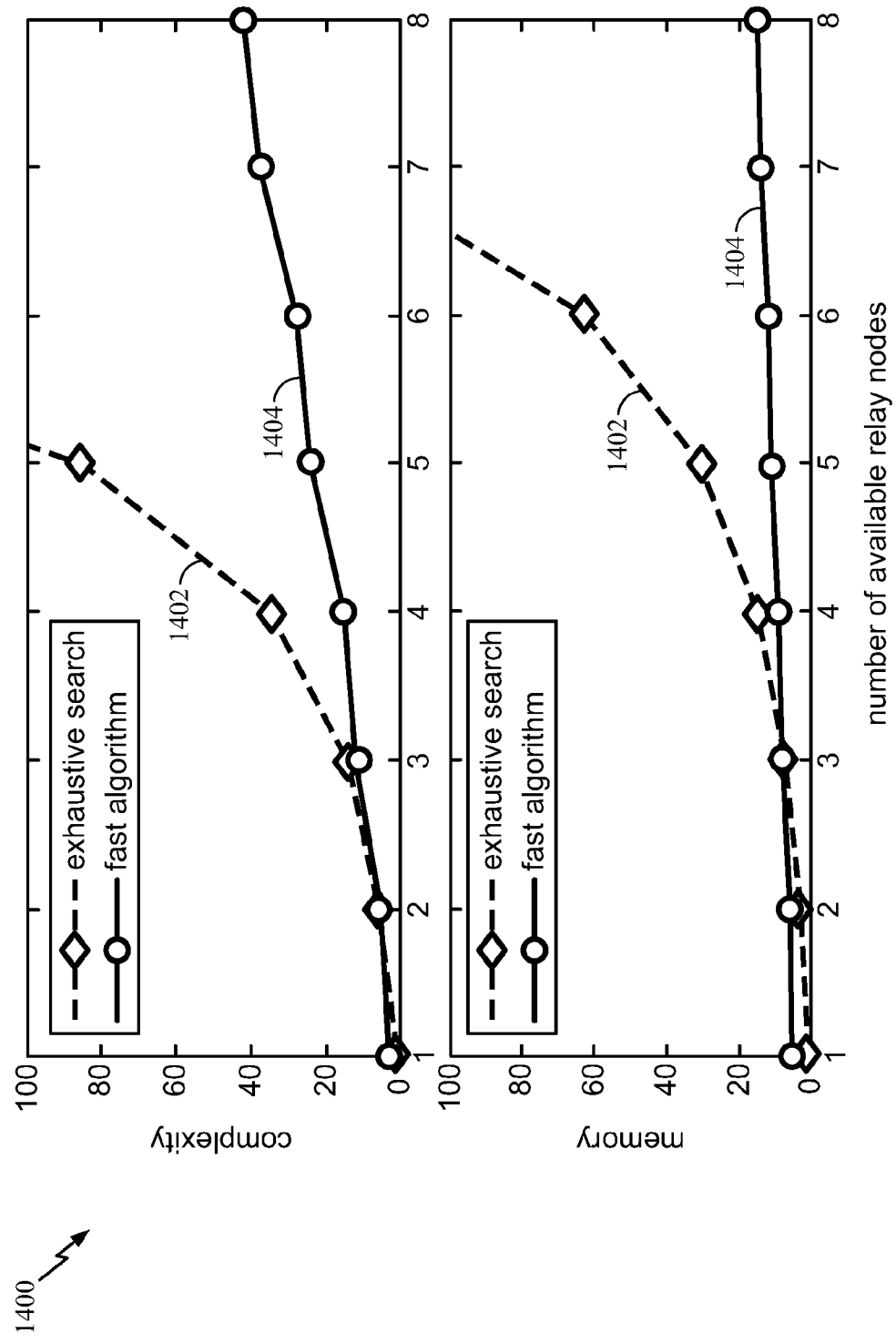
FIG. 14 illustrates a graphical representation of a comparison of complexity and memory usage of the exhaustive search algorithm with those of the fast algorithm as a function of the number of available relay nodes, in accordance with certain aspects of the present disclosure.

FIG. 14 illustrates a graphical representation 1400 of an example comparison of complexity and memory usage of the exhaustive search algorithm 1402 with those of the fast algorithm 1404 as a function of the number of available relay nodes, in accordance with certain aspects of the present disclosure. As shown in FIG. 14, the complexity and memory of the exhaustive search 1402 grows exponentially with the number of relay nodes, while the fast algorithm 1404 shows approximately a linear growth. As shown, for up to three relay nodes, both algorithms 1402 and 1404 show similar complexity, and the memory requirement of the fast algorithm 1404 is slightly higher. However, as the number of relay nodes goes beyond three nodes, the proposed fast algorithm 1404 significantly reduces complexity and memory requirements, especially for larger relay node numbers.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for wireless communication by a user equipment (UE), comprising:
 participating, with one or more other UEs, in cooperative uplink transmission to a base station, wherein each UE belongs to a UE group of a plurality of UE groups, each UE group having a unique UE group number;
 selecting at least one operation to be performed in a Transmission Time Interval (TTI) from a set of operations, wherein the selecting is based, at least in part, on a UE group number of the UE group to which the UE belongs and a TTI index of the TTI, wherein the UE is configured to select a different operation of the set of operations for a different combination of TTI index and UE group number; and
 performing the selected at least one operation for the cooperative uplink transmission.

2. The method of claim 1, wherein the set of operations includes at least two of: transmitting data as a data source, receiving data from another UE transmitting as a data source, decoding data received from another UE transmitting as a data source, or transmitting data as a relay.

3. The method of claim 2, wherein transmitting data as a relay comprises transmitting data to at least one of the base station or another UE.

4. The method of claim 2, wherein the selecting comprises:
 selecting the at least one operation from the set of operations based on a modulus function involving the UE group number and the TTI index of the TTI.

5. The method of claim 4, wherein the modulus function is based on how many different TTI indices are supported.

6. The method of claim 2, wherein the selecting comprises:
 determining, in a first TTI, to receive data transmission from the other UE transmitting as the data source;
 determining, in a second TTI subsequent to the first TTI, to decode the data; and
 determining, in a third TTI subsequent to the first TTI, to relay the data.

7. The method of claim 1, further comprising receiving information regarding the UE group number of the UE group to which the UE belongs.

8. The method of claim 1, wherein the selecting is also based on a mode configuration indicating whether or not the UE is to transmit data as a relay.

9. The method of claim 8, further comprising receiving signaling from the base station indicating the mode configuration.

10. The method of claim 1, further comprising:
 determining, for each TTI, frequency resources to use for the at least one operation.

11. The method of claim 10, wherein different frequency resources are allocated to different UEs transmitting in a same TTI.

12. The method of claim 1, further comprising:
 determining power allocation for a TTI based, at least in part, on whether the UE is transmitting data as a data source or transmitting data as a relay.

13. The method of claim 1, further comprising:
 determining channel state information (CSI) between the UE and another UE; and
 reporting the determined CSI to the base station.

14. A method for wireless communication by a base station, comprising:
 determining a plurality of UE groups for a plurality of user equipments (UEs) participating in cooperative uplink transmission to the base station, wherein each UE belongs to a UE group of the plurality of UE groups, each UE group having a unique UE group number, wherein at least one operation to be performed by a UE in a Transmission Time Interval (TTI) is selected from a set of operations, wherein the selection is based, at least in part, on a UE group number of the UE group to which the UE belongs and a TTI index of the TTI, wherein a different operation of the set of operations is selected for a different combination of TTI index and UE group number;
 communicating with the UE based on the selected at least one operation; and
 transmitting mode configurations indicating whether or not UEs in each group are configured to transmit data as a data source or to relay data received from another UE configured to transmit data as a data source.

15. The method of claim 14, further comprising:
 receiving data transmitted by one or more UEs configured to relay data.

16. The method of claim 14, further comprising:
 receiving data transmitted by one or more UEs configured to transmit data as a data source.

17. The method of claim 14, further comprising:
 for each TTI, allocating frequency resources for an operation to be performed by the UE.

18. The method of claim 17, wherein the allocating comprises allocating different frequency resources to different UEs transmitting in a same TTI.

19. The method of claim 14, further comprising:
 deciding whether or not a UE is to be configured to transmit data directly to the base station, based on a comparison of a predicted data rate for a direct link between the UE and the base station link and a predicted data rate for one or more links between the UE and the base station via one or more UEs configured to transmit data as relays.

20. The method of claim 14, wherein determining different groups for the plurality of UEs comprises:
 determining one or more UEs are in a UE group configured to transmit data as relays based on determined channel state information (CSI) measurements for one or more links between the UEs in the UE group and a UE transmitting as a data source and CSI measurements for one or more links between the UEs in the UE group and the base station.

21. The method of claim 20, further comprising:
 receiving reports of channel state information (CSI) measurements for one or more links between the UEs in the UE group and a UE transmitting as a data source; and
 measuring CSI for the one or more links between the UEs in the UE group and the base station.

22. The method of claim 20, further comprising:
 predicting data rates based on the CSI measurements; and
 determining the one or more UEs are in the UE group configured to transmit data as relays based on the predicted data rates.

23. The method of claim 22, further comprising:
 sorting potential relay UEs based on the predicted data rates; and
 selecting UEs to include in the UE group based on an analysis of predicted data rates of the sorted UEs.

24. The method of claim 23, wherein:
 the sorting comprises sorting potential relay UEs, such that the predicted data rates for links between a data source UE and the potential relay UEs are in descending order; and the selecting comprises initializing a set of UEs to include in the UE group, then expanding the set of UEs to include in the UE group based on the predicted data rates for links between the data source UE and the sorted potential relay UEs and predicted data rates for links between the sorted potential relay UEs and the base station.

25. The method of claim 24, further comprising:
sorting UEs in the expanded set of UEs to include in the UE group, such that the predicted data rates for links the potential relay UEs and the base station are in ascending order; and
shrinking the expanded set of UEs to include in the UE group by removing UEs based on the predicted data rates for links between the data source UE and the sorted UEs in the expanded set and predicted data rates for links between the sorted UEs in the expanded set and the base station.

26. The method of claim 14, further comprising:
allocating power for transmission by the UE in a TTI, based, at least in part, on whether the UE is to transmit data as a data source or transmit data as a relay.

27. An apparatus for wireless communication by a user equipment (UE), comprising:
means for participating, with one or more other UEs, in cooperative uplink transmission to a base station, wherein each UE belongs to a UE group of a plurality of UE groups, each UE group having a unique UE group number;
means for selecting at least one operation to be performed in a Transmission Time Interval (TTI) from a set of operations, wherein the selecting is based, at least in part, on a UE group number of the UE group to which the UE belongs and a TTI index of the TTI, wherein the UE is configured to select a different operation of the set of operations for a different combination of TTI index and UE group number; and
means for performing the selected at least one operation for the cooperating uplink transmission.

28. An apparatus for wireless communication by a base station, comprising:
means for determining a plurality of UE groups for a plurality of user equipments (UEs) participating in cooperative uplink transmission to the base station, wherein each UE belongs to a UE group of the plurality of UE groups, each UE group having a unique UE group number, wherein at least one operation to be performed by a UE in a Transmission Time Interval (TTI) is selected from a set of operations wherein the selection is based, at least in part, on a UE group number of the UE group to which the UE belongs and a TTI index of the TTI, wherein a different operation of the set of operations is selected for a different combination of TTI index and UE group number
means for communicating with the UE based on the selected at least one operation; and
means for transmitting mode configurations indicating whether or not UEs in each group are configured to transmit data as a data source or to relay data received from another UE configured to transmit data as a data source.

* * * * *